No. 620,267. Patented Feb. 28, 1899.
F. M. ANABLE.
ADJUSTABLE GUIDE FOR ROCK DRILL PISTON RODS.
(Application filed Nov. 17, 1898.)
(No Model.)

Witnesses,

Inventor,
Francis M. Anable
By Dewey Strong & Co.
attys

UNITED STATES PATENT OFFICE.

FRANCIS M. ANABLE, OF WESTVILLE, CALIFORNIA.

ADJUSTABLE GUIDE FOR ROCK-DRILL PISTON-RODS.

SPECIFICATION forming part of Letters Patent No. 620,267, dated February 28, 1899.

Application filed November 17, 1898. Serial No. 696,723. (No model.)

*To all whom it may concern:*

Be it known that I, FRANCIS M. ANABLE, a citizen of the United States, residing at Westville, county of Placer, State of California, have invented an Improvement in Adjustable Guides for Rock-Drill Piston-Rods; and I hereby declare the following to be a full, clear, and exact description of the same.

My invention relates to an improvement in automatically-operating rock-drills.

It consists, essentially, of supplemental removable segmental linings and corresponding-shaped sunken chambers formed in the heads, through which the piston-rod passes, and means for adjustably securing said lining-sections therein so that they may at any time be set up and adjusted to compensate for the wear caused by the weight and friction of the parts and to keep the piston and rod in constant alinement.

It also comprises details of construction, which will be more fully explained by reference to the accompanying drawings, in which—

Figure 1:
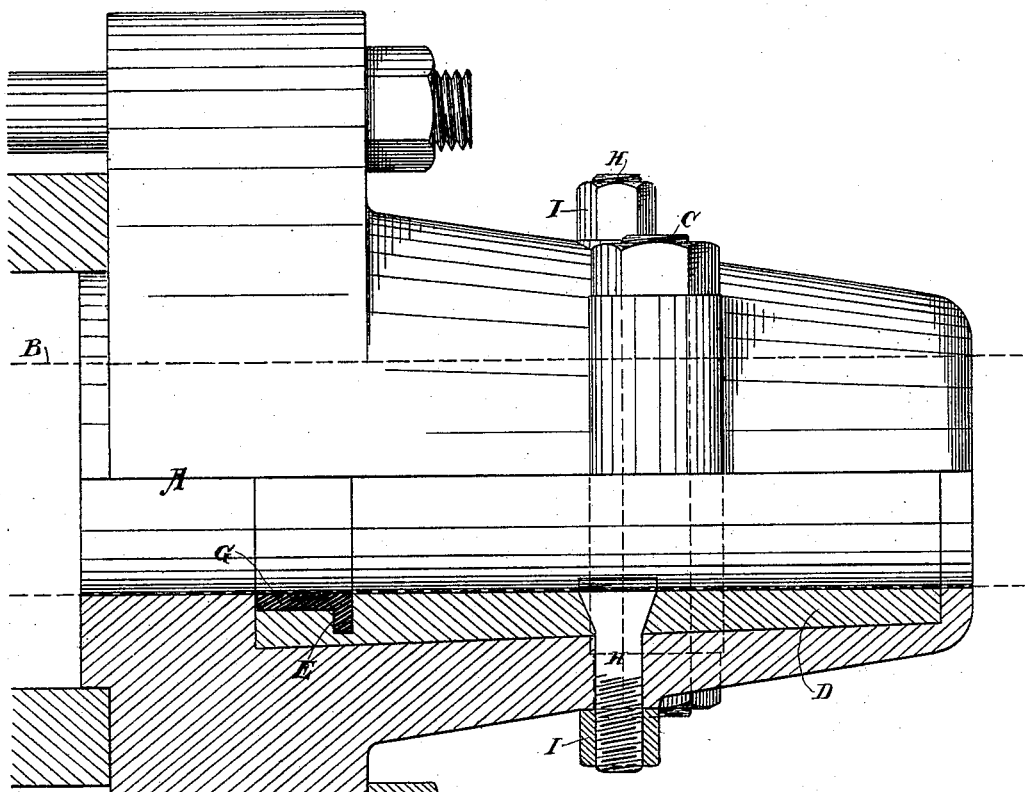
Figure 2:
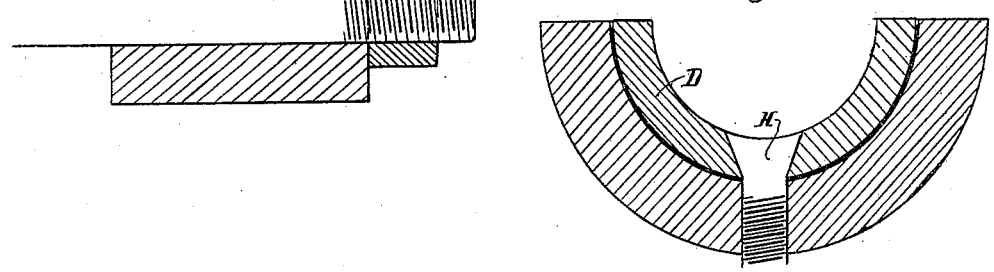

Figure 1 shows half of the guide in section and of the other half the exterior form. Fig. 2 is a lateral section of the lower part through its holding-screw.

In the construction of rock-drills the rod which connects with the piston within the cylinder at one end and has the other end formed to receive the drill, which is actuated by the reciprocation of said piston, passes through an elongated head fixed to the cylinder, and this head serves as a guide for the piston-rod. As the work is done in a variety of positions, anywhere from horizontal to vertical, there is considerable weight always bearing upon one side of this guide whenever the work is done in a line considerably away from the vertical, and with the fine dust from the rock which is being drilled and for other causes the wear of these parts is extremely rapid, necessitating the frequent replacing of the guides and of the flexible gasket which surrounds the piston-rod to form the joint. The object of my invention is to overcome this difficulty and to provide for an easy and continuous adjustment of the parts, so as to keep the piston-rod in constant alinement and perfect fit.

A is that portion of the head which is bolted to the cylinder end, this being made in two halves, which are bolted together transversely, as shown at C. Longitudinally through these segments are made the semicylindrical openings, which when the parts are put together form a cylindrical hole of a size adapted to allow the piston-rod B to reciprocate therethrough. In my invention these sections have segmental chambers of considerably-larger diameter than that of the rod, extending from near one end to near the other, leaving sufficient metal at the ends to form annular stops for the brasses, which are fitted into the chambers. The brasses D have their outer peripheries made to fit these sunken chambers, and the ends adjacent to the cylinder-head have annular grooves or channels E made in them, and the portion between these grooves and the inner ends of the brasses are of sufficiently larger diameter than the body of the brasses to receive the flexible packing-ring or gasket G, which is made, as shown, with a flange adapted to fit in the groove E, while the body lies in the larger chamber of the brasses. The piston-rod passing through this is kept sufficiently tight to prevent leakage outwardly around it. The brasses have holes made transversely through them for the passage of holding-bolts H, which are secured by nuts I, screwing upon the ends outside of the head A. The inner ends of these bolts have rectangular tapered heads which fit correspondingly-shaped countersunk chambers on the inside of the brasses, and the inner faces of these heads are curved to correspond with the inner curvature of the brasses, so that the piston-rod moves smoothly over them. When first set up for use, the brasses are fitted into the chambers formed for them and held down by the bolts, the packing-ring G being inserted, as previously described. As soon as any wear begins to take place the parts of the head are separated and taken off the piston-rod, the brasses released from their holding-bolts and lifted out of place, and shims, of thin paper, metal, or other suitable material are laid in beneath the brasses, which are then replaced and screwed down. This shim will set the brass forward a little, and when it has been made fast by the bolt and nut the edges of the brass, which now project a little beyond the edges of the half-boxes formed by the segments A, may be filed down flush with the latter, the packing-leather replaced, and the head screwed together over the piston-rod and again secured upon the cylinder end. The movement of the rod will then be found to be as perfect as when new, the packing-ring fitting and preventing any leakage. In this manner a piston-rod can always be kept tight, and, what is more essential, it can be kept in the line of travel of the piston, so that it does not bear down and cause the piston to bind or run hard in the cylinder, which would soon cause it to heat and cut the cylinder.

The device enables me to set up and perfectly adjust the parts until the brasses are entirely worn out, when they can easily be replaced by new ones without any wear or destruction of the head.

Having thus described my invention, what I claim as new, and desire to secure by Letters Patent, is—

1. In a rock-drill, the combination of the two-part segmental head having a longitudinal opening for the passage of the piston-rod, said segments having chambers formed in their interior faces and extending from near one end to the other so as to leave annular end stops, brasses fitting said chambers and abutting endwise against said stops, and bored to fit the piston-rod, said brasses having countersunk tapering openings from their inner faces, and bolts having correspondingly-shaped heads, the shanks of said bolts passing through the sides of the brasses and the coincident parts of the segments, and nuts whereby the bolts are secured in place.

2. A rock-drill cylinder-head made in two segments adapted to be bolted to the head and to fit about the piston-rod, chambers formed interior to the segments, brasses fitting said chambers and adapted to fit the piston-rod, said brasses having grooves or channels and enlarged portions near the inner end to receive packing-leathers, and bolts by which the brasses are secured to the two parts of the head substantially as described.

3. In a rock-drill of the character described, a segmental two-part cylinder-head and piston-rod guide having sunken interior chambers, segmental brasses fitting said chambers and forming a guide for the piston-rod and drill-shank, said brasses being chambered and channeled at the inner ends to receive and hold a flexible flanged packing-ring, outwardly-converging openings made centrally and transversely in the brasses with coincident bolt-holes through the outer segments, and bolts fitting therein with convergent heads to fit the openings in the brasses, said heads being concaved on the inner ends to correspond with the bore of the brasses.

In witness whereof I have hereunto set my hand.

FRANCIS M. ANABLE.

Witnesses:
S. H. NOURSE,
JESSIE C. BRODIE.